United States Patent [19]

Shimizu et al.

[11] 4,337,472
[45] Jun. 29, 1982

[54] RECORDING HEAD FOR USE IN ELECTROSTATIC RECORDERS

[75] Inventors: Youiti Shimizu, Nara; Takeo Tsumura, Moriguchi; Tadashi Matsumoto, Matsubara; Syunzi Nakai, Kashiwaa, all of Japan

[73] Assignee: Sharp Kabushiki Kaisha, Osaka, Japan

[21] Appl. No.: 118,869

[22] Filed: Feb. 6, 1980

[30] Foreign Application Priority Data

Feb. 6, 1979 [JP] Japan ............................ 54-14818[U]

[51] Int. Cl.³ .......................................... G10D 15/06
[52] U.S. Cl. ................................................. 346/155
[58] Field of Search ................ 346/139 C, 153.1, 154, 346/155

[56] References Cited

U.S. PATENT DOCUMENTS

| | | | |
|---|---|---|---|
| 3,611,419 | 10/1971 | Blumenthal | 346/155 |
| 3,653,065 | 3/1972 | Brown, Jr. | 346/154 |
| 3,718,936 | 2/1973 | Rice, Jr. | 346/155 |
| 4,165,514 | 8/1979 | Ishima | 346/139 C X |

*Primary Examiner*—Aristotelis M. Psitos
*Attorney, Agent, or Firm*—Birch, Stewart, Kolasch & Birch

[57] ABSTRACT

A recording head is disclosed which comprises an array of pin electrodes of copper wires and a plurality of pairs of auxiliary electrodes. Two lead frames are mounted to sandwich the array of pin electrodes, with one end of each lead frame serving as auxiliary electrode regions and the other end serving as lead terminals. Standing studs are planted on a printed circuit board for common connection of electrically conductive wires which connect to the pin electrodes at their tip portions and pass through the spacing between the two adjacent lead terminals.

3 Claims, 1 Drawing Figure

U.S. Patent
Jun. 29, 1982
4,337,472
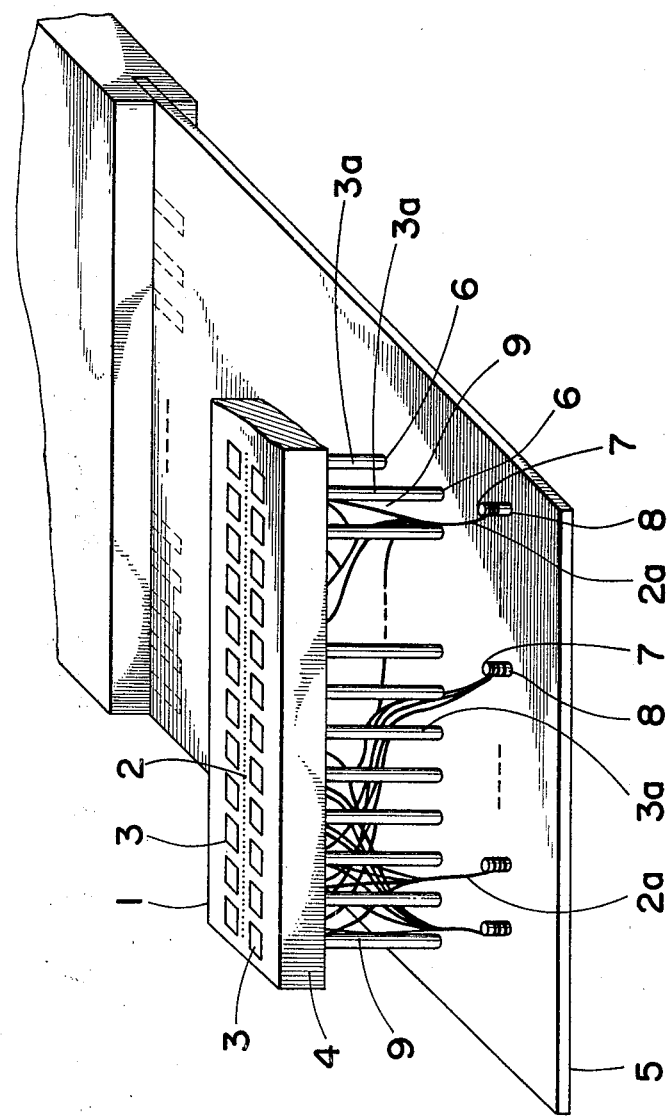

RECORDING HEAD FOR USE IN ELECTROSTATIC RECORDERS

BACKGROUND OF THE INVENTION

This invention relates to an improvement in a recording head for use in an electrostatic recorder.

The above mentioned type of recording head generally comprises an array of closely spaced pin electrodes (say, 6-8 pins/mm) and a plurality of pairs of wide auxiliary electrodes disposed adjacently to the pin electrodes and on the same side in which the array of pin electrodes faces a recording medium. See, for example, U.S. Pat. No. 3,611,419, ELECTROGRAPHIC IMAGING SYSTEM AND HEAD THEREFOR, to John Blumenthal. Since the pin electrodes and the auxiliary electrodes should both be supplied with electric signals for recording purposes, it is advisable that the leads extending between the respective electrodes and their associated terminals on a circuit board be as short as possible in order to maintain inter-electrode capacitances to a minimum. The prior art recording head is however unsatisfactory in this regard. Further, the prior art device is very troublesome to assemble and has a relatively low degree of reliability because the leads extending from the repsecitve electrodes are soldered in place on the circuit board one by one.

With the foregoing in mind, it is an object of the present invention to provide an improved recording head which is compact, highly durable and economical to manufacture with reduced lengths of leads and minimum inter-electrode capacitances.

BRIEF DESCRIPTION OF THE DRAWINGS

For a more complete understanding of the present invention and for further objects and advantages thereof, reference is now made to the following description taken in conjunction with the accompanying drawings, in which:

The single drawing is a perspective view of a recording head embodying the present invention.

DETAILED DESCRIPTION OF THE PREFERRED EMBODIMENTS

Referring now to the drawings, there is illustrated a recording head 1 which comprises an array of pin electrodes 2 closely spaced in a given interval (of the order of 6 to 8 pins/mm) and a plurality of pairs of wide auxiliary electrodes 3 at both sides of the array of pin electrodes at a different interval. The both electrodes 2 and 3 are molded together in synthetic resin material. Prior to the manufacture of the array of pin electrodes 2 copper wires of a very small dimension and isolated at their outer periphery are wound around a drum or the like at the above specified interval and at least the portions therof which form recording surfaces are affixed with each other by the use of synthetic resin. Subsequently, these portions of the copper wires are cut to expose the cross sections of the copper wires which serve recording end faces. For the auxiliary electrodes 3 there is provided a lead frame which carries a number of lead terminals formed at a given interval through the punching of a metallic sheet, each tip of the respective lead terminals being bent to set up a wide auxiliary electrode region. A pair of the above mentioned lead frames are prepared to sandwich the array of pin electrodes and the lead frames and the array of pin electrodes are molded together within the same resin material 4 while the wide auxiliary electrode regions are flush with the cross section of the array of pin electrodes. During the resin molding respective ones of the other end 2a of the copper wires associated with the pin electrodes and respective ones of the other end 3a of the lead terminals of the lead frames extend outwardly without being molded in the resin material 4. A printed circuit board 5 supports the recording head 1 and carries intelligence signals coming from the body of the recorder to the recording head 1. The printed circuit board 5 is provided with openings 6 through which the respective lead terminals 3a are threaded. The recording head 1 and the printed circuit board 5 are held in a predetermined relationship by soldering the lead terminals 3a to the openings 6. Studs 7 passing through openings 8 are mechanically and electrically secured on the printed circuit board 5, which studs are used as connection to the copper wires 2a, that is, the pin electrodes. As is well known in the art, the pin electrodes are divided into a predetermined number of groups and the pin electrodes in the same group are commonly connected to receive the same electric signals for recording purposes. The studs therefore commonly connect the pin electrodes at equivalent positions and supply the equivalent pin electrodes with electric signals at the same time. The copper wires 2a extending from the resin material 4 in the recording head are soldered to their associated studs 7 after passing through a spacing 9 between the two adjacent lead terminals in close proximity to the studs at which the copper wires at equivalent positions in the respective groups are gathered from common connection. The leg portions of the lead terminals 3a are overlaid with a vinyl tube to facilitate the insertion of the copper wires 2a. Although the copper wires 2a itself are of a very small diameter and very closely aligned, the respective groups of the commonly connected copper wires are led to the equally spaced studs 7 over the spacings 9 as a guide. This is a significant advantage that the respective copper wires can be aligned more tidily and more easily the total length of the copper wires extending from the pin electrodes and the studs becomes shorter than before.

As stated above, the overall head assembly embodying the present invention is compact through the utilization of the lead terminals of the auxiliary electrodes extending from the recording head as a recording head support with respect to the printed circuit board. The pin electrodes of the copper wires can be tidily aligned and become short since the lead terminals of the auxiliary electrodes serve as a guide when the pin electrodes of the copper wires are connected on the circuit board. This also results in a reduction in interelectrode capacitances and excellent recording performances. There is no need that the copper wires commonly connected to the same stud be soldered one by one as experienced in the prior art device. Therefore, the present invention enables simultaneous connection of the wires and attains simplicity in manufacture and a higher degree of reliability.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A recording head assembly for an electrostatic recorder comprising:
- a plurality of pin electrodes arranged substantially colinearly and spaced apart from each other;
- a plurality of auxiliary electrodes arranged on either side of said colinearly arranged pin electrodes;
- a circuit board;
- lead frame means for electrically interconnecting said auxiliary electrodes to said circuit board and for physically spacing said pin electrodes and auxiliary electrodes from said circuit board;
- connection stud means disposed on said circuit board for receiving signals from said pin electrodes; and
- a plurality of conductive wires, each connected at a first end to one of said pin electrodes and connected at a second end opposite the first end to said connection stud means;
- said lead frame means constraining said conductive wires to guide each of said wires to said connection stud means via a relatively direct path for connection thereto.

2. The head assembly of claim 1 wherein said connection stud means includes a plurality of connection studs.

3. The head assembly of claim 2 wherein said lead frame means includes a plurality of lead frame pins disposed on either side of said colinearly arranged pin electrodes;
- said conductive wires being directed to their respective connection studs by said lead frame pins;
- said conductive wires being directed in a direction parallel to said colinearly arranged pin electrodes by said lead frame pins and then substantially orthagonal to said colinearly arranged pin electrodes when a point along said colinearly arranged pin electrodes substantially adjacent to each wires respective connection stud is reached to thereby interconnect the pin electrodes to respective connection studs.

* * * * *